A. D. ROBINSON.
DESICCATING APPARATUS.
APPLICATION FILED OCT. 17, 1918.
1,330,746. Patented Feb. 10, 1920.
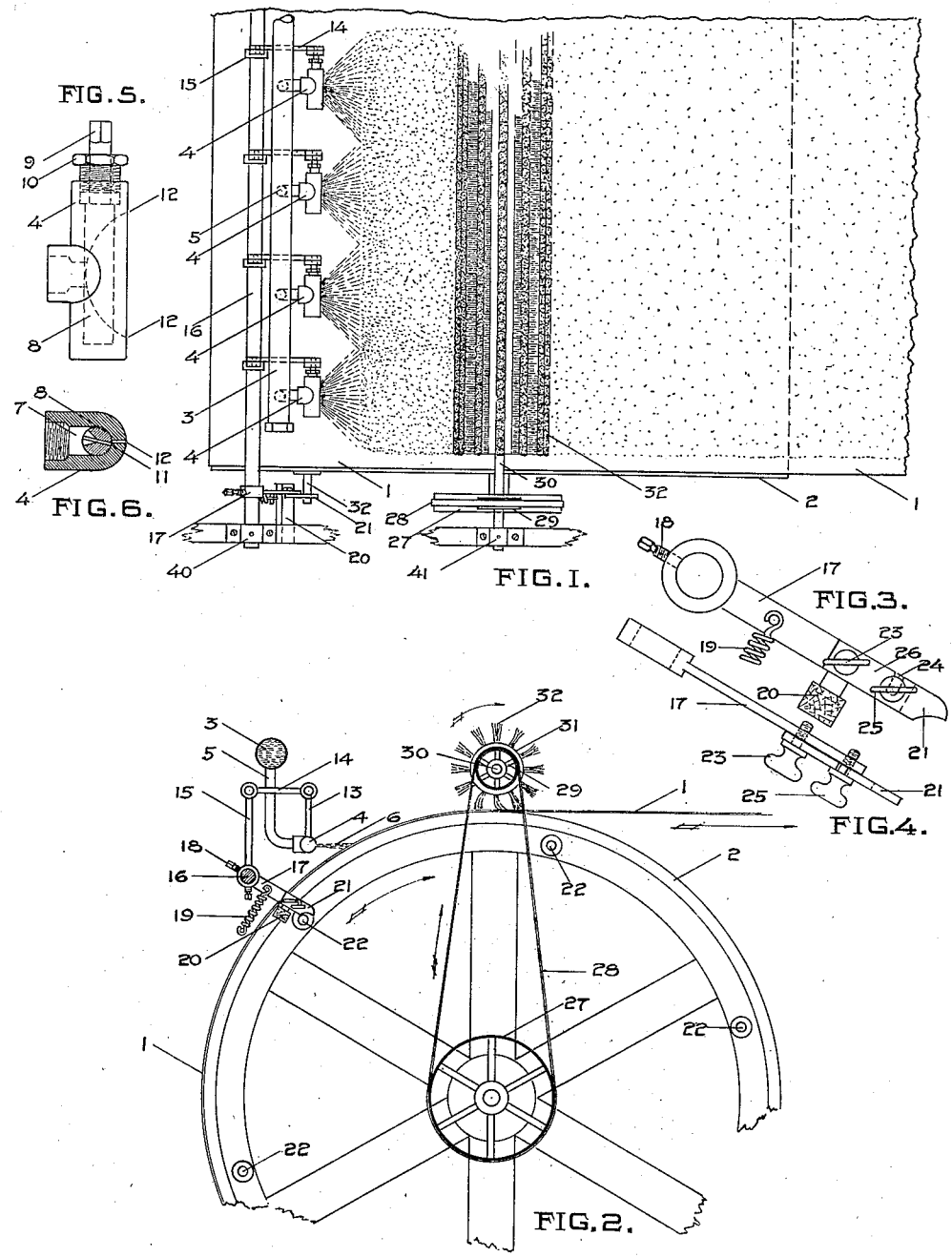

UNITED STATES PATENT OFFICE.

ARTHUR D. ROBINSON, OF ST. LOUIS, MISSOURI.

DESICCATING APPARATUS.

1,330,746.  Specification of Letters Patent.  Patented Feb. 10, 1920.

Application filed October 17, 1918. Serial No. 258,665.

*To all whom it may concern:*

Be it known that I, ARTHUR D. ROBINSON, a citizen of the United States, residing at St. Louis, in the State of Missouri, have invented certain new and useful Improvements in Desiccating Apparatus, of which the following is a full, clear, and exact specification, reference being had to the accompanying drawings, which form a part thereof.

My invention relates to desiccating apparatus to be used for drying substances, such as eggs, which while in a liquid or batter-like condition is applied to a moving belt and by this latter is carried into a hot chamber where the batter is subjected to the desiccating action of hot air so that the batter is dried and remains on the belt in a powder-like form. This powder is removed from the belt by proper scraping apparatus and is then used in the various arts.

My invention relates particularly to apparatus for desiccating eggs and has for its object the providing of a suitable apparatus whereby the eggs in a batter-like condition are applied in a layer of substantially uniform thickness to a moving belt; and another object of my invention is to provide an apparatus whereby the eggs in a batter condition may be applied under pressure in the form of a spray onto a moving belt; and a still further object of my invention is to provide an apparatus whereby the batter formed of eggs is automatically applied at predetermined intervals on a moving belt.

My invention is fully shown in the accompanying drawings where similar letters are used to designate similar parts. Figure 1 shows a plan view of a part of an egg desiccating apparatus having my improved apparatus for applying the egg batter to the moving belt; Fig. 2 is a side elevation of the part of the apparatus shown in Fig. 1; and Figs. 3, 4, 5 and 6, are views showing certain parts of the apparatus in detail.

Referring to the figures, 1 is an endless belt which is made to pass over the drum 2 at one end of the apparatus, and over a similar drum at the other end of the apparatus. Intermediate the drums it is made to pass through a hot air chamber in which the moisture is removed from the batter of egg which had been previously applied to the belt. It is understood, of course, that the drum 2 and the drum at the other end of the apparatus are rotatably mounted on suitable shafts and provided with means whereby they may be turned, so as to make the belt advance from one drum toward the other, thus carrying the batter on the belt through the drying chamber. Since my invention is not concerned in any way with the construction of the belt, or the drums, or the drying chamber, the drawings do not show the drying chamber and show only a part of the belt and a part of one of the drums. The eggs are broken and the whites and the yellows are mixed together by means of a suitable apparatus, not shown in the drawings, and is then put into a supply reservoir, not shown, where it is preferably under pressure. Leading from the supply reservoir there is a discharge pipe 3 whereby the batter is conveyed to the desiccating apparatus, and from which the batter is discharged through the head 4 at the end of the branch pipe 5. The head 4 is preferably so constructed that the batter issues therefrom in a thin, sheet-like spray 6, which falls on the belt 1 near the upper part of the drum 2. In the drawings the belt 1 is supposed to be advancing from the left toward the right, so as to carry the batter applied to the belt away from the head 4 and toward the top of the drum. The construction of the head 4 is shown in detail in Figs. 5 and 6. The head comprises a body part 7 which has mounted in it a rotatable valve piece 8 which has its outer end 9 squared, as shown, and which is provided with a gland 10 which allows the valve piece 8 to revolve in the body 7 while at the same time holding the valve piece in operative position and preventing leakage of the batter out of the interior of the body 7. The valve piece 8 is provided with the slot 11 which is adapted to register with the slot 12 in the body 7. When the slots 11 and 12 register, batter is allowed to pass therethrough and be discharged onto the belt 1. It is evident that the shape of the stream 6 of batter issuing from the head 4 depends upon the length and width of the slot 12. I prefer to make this slot long and narrow so that the stream will have a thin, fanlike shape form such as shown in Fig. 1. 13 is a link mounted on the square end 9 of the valve piece 8 so that the valve piece may be turned by moving the link 13. The link 13 is connected by means of the link 14 to the arm 15 which is rigidly attached to the rocker shaft 16, so that when the shaft 16 is made to turn in its bearings the arm 15 will move the link 13 and thus bring the slot 11 into or out of register with the slot 12, depending upon the direction in which the shaft is rotated. The shaft 16 is mounted in suitable bearings 40, formed on the frame of the apparatus. Attached to the shaft 16 there is the rocker arm 17 which is held in adjusted position on the shaft 16 by means of the set screw 18. 19 is a tension spring having one end attached to the arm 17 and the other to a fixed point on the frame of the machine; and 20 is a stop carried by the frame of the machine against which the arm 17 is made to bear because of the tension of the spring 19. In the specific embodiment of my invention shown in the accompanying drawings, when the arm 17 is in the position shown in the drawings the slots 11 and 12 of the head 4 are out of register and no batter is isuing from the head 4 onto the belt 1. The end 21 of the arm 17 is cut away as shown in the drawings so that the pins 22, fixed at intervals on the end of the drum 2, may contact therewith and act to move the arm 17 upwardly and thus cause the shaft 16 to rotate from the right toward the left. The result of this motion of the shaft 16 will be that the slots 11 and 12 of the head 4 will be made to register and batter will be allowed to issue from the head in the stream 6 which will impinge upon the moving belt 1 and be carried therewith. The stream of batter 6 will issue from the head 4 only while the slots 11 and 12 are in register, and the length of time during which they will be in register will depend upon the movement given to the arm 17 by means of the pin 22 contacting with the end 21 of the arm. When the pin 22 is made to contact with the arm 21 by reason of the rotation of the drum 2 the arm 17 will be moved and held up until the pin 22 has passed beyond the end 21 of the arm, and then the spring 19 will throw the arm back into contact with the stop 20, and the orifices 11 and 12 will then be out of register so that the batter will not issue from the head 4. There will be no flow of batter from the head except at such times when the slots are made to register through the action of a pin 22 on the end 21 of the arm 17. This insures that the batter will be applied automatically at predetermined intervals upon the belt 1. It may be desirable at times to cause the batter to flow continuously during a certain interval from the head 4, and to have this flow entirely independent of the drum 2. In this case the arm 17 may be made as shown in Figs. 3 and 4, where the arm 17 is made in two parts. The end part 26 is pivoted by means of the set screw 23 onto the main body part of the arm, and has a slot 24 which is adapted to pass over the screw 25. The outer end of the part 26 may be shaped as shown at 21 to contact with the pin 22. When the end part 26 is held in the position shown in Fig. 3 by means of the screws 23 and 25 the pin 22 will contact with the end 21 so as to open and close at regular intervals the valve in the head 4. When it is desired to have the batter discharged continuously from the head 4 without regard to the pin 22, the screws 23 and 25 are loosened and the end piece 26 is swung down and made to contact with the stop 20 so as to hold the arm 17 in such a position that the slots 11 and 12 will be in register so as to permit the batter to flow from the head 4.

27 is a pulley mounted on the shaft of the drum 2 and rotatable therewith and which is connected by means of the belt 28 with the pulley 29 mounted on the shaft 30 which is carried in bearings 41 formed on the frame of the apparatus. On the shaft 30 there is mounted a drum 31 which carries a plurality of rows of bristles 32. When the drum 2 revolves the shaft 30 is made to revolve by means of the belt 28 and thus the drum 31 and the bristles 32 are made to revolve, and as the bristles 32 revolve they press against the surface of the belt 1 and distribute or spread out the batter on the belt. The spreading action of the revolving bristles 32 is especially desirable when the batter is applied intermittently as it insures that the batter will be spread over the belt in a very thin and substantially uniform layer, thus insuring that the material will be thoroughly desiccated during its passage through the drying chamber.

I find that when the batter is applied intermittently to the belt 1 it is easier to dry it because it is easier to spread the batter over the belt and it is easier to get a thin layer of batter on the belt. When the batter is applied in a continuous stream it is difficult to prevent the batter accumulating and running down toward the left of the drum 2, and it is also more difficult to apply the batter in a uniformly thin layer to the belt.

It is evident that the size and the number of heads 4 may be varied to suit different requirements; and also, that the heads may be used without the distributing bristles 32 and in some cases get satisfactory results.

What I claim as new and desire to secure by Letters Patent is:

1. A desiccating apparatus for eggs and the like comprising a drying belt adapted to receive in a batter condition the material to be dried, a plurality of discharge heads arranged transversely of said belt, a supply pipe whereby batter is supplied to said heads under pressure, means whereby said heads may be simultaneously automatically and intermittently opened to permit the discharge therethrough of batter, and a revolving brush whereby said batter is spread on said belt.

2. A desiccating apparatus for eggs and the like comprising a drying belt adapted to receive in a batter condition the material to be dried, a plurality of discharge heads arranged transversely of said belt, a supply pipe whereby batter is supplied to said heads under pressure, a drum over which said belt passes, a rocker shaft, means operated by said rocker shaft whereby said discharge heads are simultaneously opened, a rocker arm attached to said shaft and extending inwardly past the outer circumference of said drum near one end thereof, a pin positioned on the end of said drum so as to contact with and move said rocker arm when said drum is revolved, and a revolving brush whereby said batter is spread on said belt.

3. A desiccating apparatus for eggs and the like comprising a drying belt adapted to receive in a batter condition the material to be dried, a plurality of discharge heads each having an elongated narrow outlet controlled by a valve piece rotatably mounted in said head, said discharge heads being disposed transversely of said belt, a rocker shaft, means operated by said rocker shaft whereby said valve pieces in said discharge heads are simultaneously opened or closed, a drum over which said belt passes, a rocker arm attached to said rocker shaft and extending inwardly past the outer circumference of said drum near one end thereof, and a pin positioned on the end of said drum so as to contact with and move said rocker arm when said drum is revolved.

In witness whereof I have signed my name to this specification.

ARTHUR D. ROBINSON.